United States Patent [19]

Juguin et al.

[11] Patent Number: 4,498,907
[45] Date of Patent: Feb. 12, 1985

[54] PROCESS FOR UPGRADING CUTS OF VERY HIGH CYCLOPARAFFINS CONTENT

[75] Inventors: Bernard Juguin, Rueil Malmaison; Germain Martino, Poissy; Jean Miquel, Paris, all of France

[73] Assignee: Institut Francais du Petrole, Rueil Malmaison, France

[21] Appl. No.: 393,913

[22] Filed: Jun. 30, 1982

[30] Foreign Application Priority Data

Jun. 30, 1981 [FR] France ................... 81 13001

[51] Int. Cl.$^3$ ................................. C10L 1/02
[52] U.S. Cl. ............................. 44/56; 44/78; 208/89; 208/141; 208/216 R
[58] Field of Search ............... 44/56, 78; 208/89, 141, 208/8 LE, 8 R, 10, 216 R

[56] References Cited

U.S. PATENT DOCUMENTS

| | | | |
|---|---|---|---|
| 1,516,907 | 11/1924 | Backhaus | 44/56 |
| 1,525,578 | 2/1925 | Friesenhahn | 44/56 |
| 2,416,894 | 3/1947 | Barron | 208/141 |
| 2,769,761 | 11/1956 | Annable et al. | 208/89 |
| 3,902,868 | 9/1975 | Zoch, Jr. | 44/56 |
| 3,980,721 | 9/1976 | Juguin et al. | 585/660 |
| 4,311,578 | 1/1982 | Fant et al. | 208/8 LE |

OTHER PUBLICATIONS

*Modern Petroleum Technology*, Hobon, et al., Applied Science Publishers Ltd., Great Britain, pp. 363-364.

Primary Examiner—William R. Dixon, Jr.
Assistant Examiner—Margaret B. Medley
Attorney, Agent, or Firm—Millen & White

[57] ABSTRACT

Process for the production of a liquid effluent comprising at least 75% of aromatic hydrocarbons from a naphtha feed charge of high sulfur, nitrogen or oxygen content; said process comprises two steps: (a) hydrotreatment of the charge to decrease its sulfur, nitrogen or oxygen content to selected values, and (b) dehydrogenation of the product of step (a) in the presence of a supported catalyst whose neutralization heat by ammonia adsorption is lower than about 40 joules per gram at 300 mm Hg.

6 Claims, No Drawings

PROCESS FOR UPGRADING CUTS OF VERY HIGH CYCLOPARAFFINS CONTENT

BACKGROUND OF THE INVENTION

This invention relates to a process for improving the octane number of a naphtha cut recovered from heavy petroleum products, e.g., a cut recovered from treatments applied to crude oils (treatments such as the cracking of heavy products), or of a naphtha cut recovered from a fractionation zone for oils obtained by liquefaction of coal with hydrogen.

A naphtha cut of this type, used as feed charge, distills at between about 25° and 230° C. (if necessary between 30° and 220° C.) and comprises usually at least 70% b.w. of (alkylated or not alkylated) naphthenic (cycloparaffinic) hydrocarbons comprising 3 to 30 carbon atoms per molecule; it generally also contains one or more compounds selected from the sulfur compounds, the nitrogen compounds and the oxygen compounds, this cut having a content by weight of at least 1000 ppm, as sulfur, of sulfur compounds, and/or of at least 1000 ppm, as nitrogen, of nitrogen compounds, and/or of at least 2000 ppm, as oxygen, of oxygen compounds.

The usual method to upgrade a naphtha of this type and to obtain, for example, motor-grade gasoline, is to subject it to catalytic reforming. However, since the catalytic reforming reactions necessitate catalysts of outstanding stability and life time, more and more sophisticated bifunctional catalysts have been used, for example bimetallic catalysts, which contain, in addition to an acid carrier, two metals usually belonging to the platinum family, which catalysts now often contain 3 or more metal elements. To avoid a premature decrease of the stability and life time of the reforming catalysts (which are sensitive to the sulfur, nitrogen and oxygen impurities of the charge subjected to reforming), it is necessary that the charge, before admission into the reforming zone, be subjected to a hydrotreatment performed under severe conditions, particularly under a high pressure of, for example, about 100 to 120 bars, to decrease the sulfur content of the charge to less than about 20 ppm, the nitrogen content to less than about 10 ppm and the oxygen content to less than about 15 ppm. As a matter of fact, outstanding results in the reforming zone are only obtained if the content of each of the oxygen, nitrogen and sulfur elements is not higher than 1 ppm. Further, at the outlet of the hydrotreatment zone, the charge is dried before being supplied to the reforming zone.

Finally, the reaction of catalytic reforming, irrespective of the preliminary hydrotreatment, must be effected under relatively severe conditions: operation performed at between 510° and 600° C., under a pressure of 1 to 15 bars, at an hourly velocity of 1 to 10 volumes of liquid charge per volume of catalyst, the hydrogen/hydrocarbon ratio being from 5 to 20.

The reforming catalyst has both a dehydrogenation function and an isomerization function. The first function is conferred by the metals of the catalyst and the second function results from the acidic properties of the catalyst.

These acidic properties are generally intrinsic to the selected carrier; they are however generally increased and/or modified by introduction of elements such as fluorine, chlorine, etc.

However, the acidic function of the catalyst also promotes certain undesirable reactions such as cracking or formation and deposit of carbon or coke on the catalyst, which results in a quick deactivation of the catalyst and consequently in a significant decrease of the yield of the resultant products and in the formation of hydrogen contaminated with hydrocarbons such as methane, ethane, etc.

SUMMARY OF THE INVENTION

In conformity with the present invention, a judicious combination of (a) a hydrotreatment step performed under non-severe conditions and (b) a step of dehydrogenating the hydrotreatment effluent, effected in the presence of a non-acidic or weakly acidic catalyst, yields, after completion of the process conforming to the invention, a liquid product of very high aromatic hydrocarbons content and whose octane number is of the same order of magnitude as that obtained by severe hydrotreatment followed with reforming, however with a higher content of aromatic hydrocarbons than the product obtained by severe hydrotreatment and reforming. The use of a non-acidic or weakly acidic carrier reduces to a minimum the parasitic secondary reactions, thus those other than the reaction of naphthenes dehydrogenation. This results in a higher aromatic hydrocarbons yield and an increased life time and stability of the catalyst, thus longer cycle times. The resultant liquid product thus contains at least 75% b.w. of aromatic hydrocarbons and can be used, for example, as motor gasoline or as fuel for any other type of combustion engine.

DETAILED DISCUSSION

The advantage of obtaining a gasoline of high aromatic hydrocarbons content for use as motor gasoline is, for example, to increase the gasoline tolerance to water; this point is important nowadays when trying to produce fuels by admixing hydrocarbon gasolines with quite variable amounts of at least one additive such as methanol, ethanol and higher alcohols such as propanol, butanol, acetone, isopropanol, isobutanol, etc . . . , most of them having nonnegligible contents of water, resulting from the methods of manufacture or fractionation of these additives. Thus, the hydrocarbons gasoline obtained by the process of the invention can be combined with butanol, acetone and methanol to form a fuel or a combustible containing, for example, by weight:

(a) 5 to 96% of hydrocarbons gasoline of high aromatic hydrocarbons content,
(b) 1 to 95% of a mixture containing, by weight, 40 to 85% of butanol and 15 to 60% of acetone,
(c) 1 to 25% of methanol.

The fuel or combustible preferably comprises, by weight:

(a) 35 to 85% of hydrocarbons gasoline,
(b) 15 to 65% of a mixture which, at will, can comprise ($\alpha$) butanol and acetone, or ($\beta$) butanol, acetone and isopropanol, or ($\gamma$) butanol, acetone and ethanol or ($\delta$) butanol, acetone, ethanol and isopropanol, and
(c) 1 to 25% of methanol.

In the same manner, the hydrocarbons gasoline of high aromatic hydrocarbons content, obtained by the process of the invention, may be combined with methanol and higher homologous alcohols, so that the combustible or fuel thus obtained contains, by weight:

(a) 60 to 97% of said gasoline and (b) 3 to 40% of a mixture comprising, by weight, 25 to 90% of methanol (eventually 60 to 90%) and 75 to 10% (eventually 40 to 10%) of higher homologous alcohols (particularly ethanol, n-propanol and n-butanol).

Methanol and the higher homologous alcohols may have been prepared in one or more steps from synthesis gas.

Another advantage of the invention lies in the production of aromatic hydrocarbons sources leading, after adequate treatments (for example extraction, distillation, etc . . . ) to such products as benzene, toluene, xylenes and ethylbenzene whose many uses are known, for example in the fields of the plastic materials, the detergents, the elastomers and the synthetic fibers, etc.

The process of the invention allows the dehydrogenation of a charge containing, after passage of the initial charge through the zone of moderate hydrotreatment, up to 500 ppm of sulfur (usually more than 60 ppm), up to 100 ppm of nitrogen (usually more than 40 ppm) and up to 1500 ppm of oxygen (usually more than 500 ppm). The hydrotreatment, in these conditions, is not performed under severe conditions, and, for example, the pressure is generally selected between 40 and 70, optionally between 50 and 60 bars, the temperature between 350° and 420° C. and the VVH between 1 and 8.

The catalyst used in the dehydrogenation zone, on the one hand, is sufficiently selective to avoid the occurence of secondary reactions leading to the fouling of the catalyst, thus to a decrease of the life time of the catalyst and, on the other hand, has a substantial resistance to the poisons of the charge (nitrogen, sulfur, oxgyen compounds), which explains why a thorough preliminary hydrotreatment of the charge is not necessary.

The catalyst comprises a carrier, for example alumina or silica, and this carrier is neutral or weakly acidic. The acidity of the carrier may be determined by the known test of ammonia adsorption, of the type described, for example, in Journal of Catalysis, 2, 211–222 (1963); the method consists of heating the catalyst up to 600° C. under vacuum (0.01 mm Hg) up to complete gas removal (particularly for removing water and undesirable impurities); the catalyst is then placed in a calorimeter at 320° C. and ammonia is introduced in sufficient amount to raise the final pressure of the system to 300 mm Hg (300×133.322 Pa); the amount of heat released is determined. The preferred carriers have an "ammonia adsorption neutralization heat" lower than 40 joules and preferably lower than 35 joules per gram. When using alumina, the latter has preferably a specific surface generally comprised between about 20 and 200 m$^2$/g, preferably between 50 and 100 m$^2$/g, with a pore volume comprised, for example, between about 0.40 and 0.80 cc/g with at least 75% of the porosity corresponding to pores with an average diameter between 5 and 30 nanometers.

The neutralization heat as well as the surface and the pore volume of the catalysts obtained with this type of carrier are of the same order of magnitude as those stated hereinabove for the carrier.

The aluminas to be used as carrier are not all equivalent and preference will be given to transition alumina balls; however other alumina particles can be used, such as extrudates or pellets with the above properties.

If the acidity of the alumina or silica carrier is found to be too large, it can be adjusted by adding, before or after the introduction of the dehydrogenation agents, certain compounds which are able to neutralize the carrier or to decrease its own acidity. By way of examples, oxides, hydroxides, carbonates, etc . . . of alkali metals or, alkali-earth metals or certain rare earth metals can be used. It is not necessary, as a rule, to introduce more than 2% b.w. or even more than 1% b.w. of this neutralizing compound (by weight with respect to the catalyst carrier).

When using an association of two or more metals, as dehydrogenation agent, for example an association of at least one first metal of group VIII of the periodic table of the elements with a second metal either of the same group or of the groups IB, IIIB, IVB, VIA and VIIA of the periodic classification of the elements, the content b.w. of the first metal is, for example, between 0.01 and 2% and preferably between 0.1 and 0.6% and that of the second metal, for example, between 0.01 and 2% and preferably between 0.1 and 0.6%. If the association of metals comprises a third metal, the content b.w. of this third metal is, for example, between 0.01 and 2% and preferably between 0.1 and 0.6%.

It is clear that this type of association between several metals does not constitute a limitation; as a matter of fact, all types of catalytic combinations can be used, for example those described in the French Pat. No. 2 036 832, No. 2 087 391, No. 2 087 685, No. 2 088 992, No. 2 134 763, No. 2 144 985, No. 2 161 265, No. 2 161 302, No. 2 209 604, No. 2 372 883 and No. 2 887 496.

The dehydrogenating elements (metals of the groups defined in the hereinbefore mentioned patents and in the type of combination just cited) may be deposited separately or simultaneously on the carrier by means of solutions thereof, for example aqueous solutions of platinum, iridium, ruthenium and palladium, of hexachloroplatinic and hexachloroiridic acids, of hexachloroplatinate and noble hexachlorometallates, of platinum and noble metals diamminodinitrites, of ammonium, sodium or potassium meta or paratungstate, etc.

The dehydrogenating elements once deposited on the carrier, the catalyst is then dried, calcined by heating in an oxidizing atmosphere at a temperature of, for example, 300° to 1000° C., then reduced in a hydrogen stream at a temperature of, for example, about 350° to 700° C. for 2 to 30 hours, the rate of hydrogen supply being from 100 to 1000 times the catalyst volume. The latter operation is preferably performed in the dehydrogenation reactor. The calcination may also be omitted and the reduction performed directly.

The reduction temperature is of appreciable importance:

for example, when the dehydrogenating elements are platinum, iridium, palladium or ruthenium alone or associated two by two and admixed with hydrogen, the reduction temperature is preferably from 550° to 600° C., when the catalyst contains one or several metals of the platinum family, associated for example to tungsten, the reduction temperature may be milder; it is preferably between 500° and 550° C.

The catalyst used in the present invention may be employed as a fixed or moving bed.

When working with a moving bed, at least two reactors are preferably used, if not 3 or 4 reactors or reaction zones. The reactors comprise each a moving bed of catalyst. The use of moving beds allows a continuous regeneration of the catalyst: thus, the charge circulates successively through each reactor or reaction zone, the flow being axial or radial (radial indicates a flow from the center to the periphery or from the periphery to the center). The reaction zones are serially arranged, for example side by side or superposed. The use of side by side reaction zones is preferred. The charge flows successively through each of these reaction zones, with intermediate heating of the charge between the reaction zones; the fresh catalyst is introduced at the top of the first reaction zone, where the fresh charge is also admitted; it flows progressively downwardly in this zone to be progressively discharged at the bottom; it is then transferred by any appropriate means (particularly with a lift when utilizing side by side reactors) to the top of the following reaction zone where it flows progressively, also downwardly, and so on up to the last reaction zone at the bottom of which the catalyst is also discharged progressively and then fed to a regeneration zone. At the output of the regeneration zone, the catalyst is progressively supplied to the top of the first reaction zone. The various discharges of catalyst are effected "progressively" as mentioned above.

"Progressively" means that the catalyst may be discharged either continuously or periodically.

The dehydrogenation, in conformity with the process of the invention, is performed under relatively less severe operating conditions as the catalytic reforming; thus, the average temperature is between 450° and 550° C., the pressure between about 5 and 20 bars and preferably between 6 and 15 bars, the hourly feed rate between 1 and 10 volumes of liquid charge per volume of catalyst and the recycle rate between 5 and 15 moles of hydrogen per mole of the feed charge.

It is recalled that the process of the invention allows the supply to the dehydrogenation zone of charges of lower purity as compared with those used in catalytic reforming. In fact, the present process can be used to convert cuts containing more than 70% of naphthenes in the presence of up to 500 ppm of sulfur and/or up to 100 ppm of nitrogen and/or up to 1500 ppm of oxygen, without substantial loss of activity, selectivity, yield and life time of the catalyst, which makes it unnecessary to further treat the charge to bring the nitrogen, sulfur and oxygen content to the specifications of the catalytic reforming processes.

The catalyst used in the following experiments has the following composition:
0.2% b.w. of platinum
0.2% b.w. of tungsten,
these two metals being deposited on gamma alumina.

This catalyst has been prepared by impregnating gamma alumina balls having a specific surface of 69 m$^2$/g and whose pore volume amounts to 58 cc per 100 g (75% of this pore volume correspond to pores with an average diameter comprised between 10 and 50 nanometers). The neutralization heat by ammonia adsorption of this gamma alumina is 30 joules per gram under 300 mm Hg (300×133.322 Pa). 100 g of these alumina balls are impregnated with 58 cc of an aqueous solution containing 6.7 cc of hexachloroplatinic acid solution with a 3% b.w. platinum content and with 51.3 cc of a solution containing 0.273 g of ammonium metatungstate with a 92.3% b.w. content of WO$_3$. The contact is maintained for 3 hours; after 3 hours, the alumina balls have completely absorbed the solution. Drying is performed in an oven at 100° C. for 6 hours, then calcining in an air stream for 2 hours at 400° C., then for 2 hours at 500° C. After cooling, the catalyst is transferred into the dehydrogenation reactor where it is reduced for about 12 hours at 530° C. in a hydrogen stream of 50 liters/hour.

EXAMPLE 1

A cut C$_5$—180° C. with the composition given in Table I is passed through the above catalyst, arranged as a fixed bed in a reactor, at a space velocity of 2 volumes of liquid charge per volume of catalyst per hour, at a temperature of 500° C. and under a pressure of 10 bars, the molar ratio hydrogen/hydrocarbon cut being 5 at the input of the reactor.

The charge was recovered from a naphtha obtained by fractionating oils resulting from the hydrogen liquefaction of coal.

Before being subjected to dehydrogenation, the charge is subjected to a hydrotreatment (to decrease the oxygen, sulfur and nitrogen contents to the values given in Table I) under 55 bars, at 380° C. and with a VVH of 3 (the catalyst consists of nickel and molybdenum deposited on alumina).

By way of comparison, a portion of the charge is also subjected to a catalytic reforming reaction under the same operating conditions as used in the dehydrogenation. However the selected temperature is 500° C. and the catalyst further contains 1.14% b.w. of chlorine.

The results are given in Table I.

TABLE I

|  | CHARGE | HYDRO-TREATMENT EFFLUENT | DEHYDROGENATION EFFLUENT (yield) | REFORMING EFFLUENT (yield) |
|---|---|---|---|---|
| Paraffins C$_5$— | — | — | — | 3.57% b.w. |
| Paraffins C$_5$+ | 14.85% b.w. | 14.85% | 14.80% b.w. | 16.33% b.w. |
| Cycloparaffins | 76.0% b.w. | 76.00% | 4.94% b.w. | 3.18% b.w. |
| Aromatics | 9.15% b.w. | 9.15% | 76.56% b.w. | 73.39% b.w. |
| N: impurities as ppm | 1,500 | 50 | | |
| S: impurities as ppm | 2,000 | 100 | | |
| O: impurities as ppm | 5,000 | 1,000 | | |
| Yield b.w. C$_5$+ | | | 96.30% b.w. | 92.90% b.w. |
| Spec. grav. of the C$_5$+ (20° C.) | | | 0.841 | 0.834 |
| Octane No. RON clear | | | 98 | 99 |
| RON with 0,05% Pb | | | 102 | 102 |

EXAMPLE 2

A cut having a similar composition to that of the hydrotreatment effluent of example 1 is prepared from pure materials (C$_5$+ parafins, cycloparaffins and aromatics) which are mixed to obtain the same percentages as in the hydrotreatment effluent obtained in example 1.

Several portions (a) to (f) are made; nitrogen compounds (portions a and b), or sulfur compounds (portions c and d) or oxygen compounds (portions e and f) are added thereto, in order to determine the influence of those types of impurities on the C$_5$+ percent by weight yield of the reforming reactions and the dehydrogenation reactions respectively. Relatively high proportions of impurities have been used in the portions (a), (c) and (e), as concerns the dehydrogenation reaction; however relatively low proportions of impurities (10 ppm of nitrogen for the portion b, instead of 50 for the portion a; 20 ppm of sulfur for the portion d, instead of 100 for the portion c; 10 ppm of oxygen for the portion f instead of 1000 for the portion e) have been used, as concerns the reforming reactions, to have an acceptable yield in said reactions.

The operating conditions of the reforming and dehydrogenation reactions are the same as in example 1; however the temperature is so adjusted as to obtain, in the six experiments, a product with a RON clear of 98.

The results are given in Table II.

TABLE II

| SELECTED PORTION | TEST | IMPURITY as ppm | | | T °C. | C$_5$+ yield b.w. |
| --- | --- | --- | --- | --- | --- | --- |
| | | N | S | O | | |
| (a) | Dehydrogenation | 50 | — | — | 510° | 95.90 |
| (b) | Reforming | 10 | — | — | 520° | 89.50 |
| (c) | Dehydrogenation | — | 100 | — | 505° | 96 |
| (d) | Reforming | — | 20 | — | 512° | 88.6 |
| (e) | Dehydrogenation | — | — | 1000 | 507° | 95.9 |
| (f) | Reforming | — | — | 10 | 511° | 88.7 |

What is claimed is:

1. A process for upgrading a naphtha cut distilling between about 25° and 230° C. and comprising at least 70% by weight of naphthenic hydrocarbons, said cut being recovered from heavy petroleum products or from fractionation of oils obtained by liquefaction of coal with hydrogen, said cut containing at least 1000 ppm by weight as sulfur of sulfur compounds, at least 1000 ppm by weight as nitrogen of nitrogen compounds and at least 1000 ppm by weight as oxygen of oxygen compounds, said process comprising the steps of:

(a) subjecting said cut to a moderate hydrotreatment under such conditions that the resultant effluent contains about 60–500 ppm by weight as sulfur of sulfur compounds, about 40–100 ppm by weight as nitrogen of nitrogen compounds and about 500–1500 ppm by weight as oxygen of oxygen compounds; and (b) conveying the effluent from step (a) directly to a dehydrogenation zone and contacting said effluent in said zone with a neutral or weakly acidic supported dehydrogenation catalyst whose neutralization heat by ammonia absorption is less than about 40 joules per gram at 300 mm Hg, said contacting being effected under such conditions that the resultant liquid effluent contains at least 75% by weight of aromatic hydrocarbons;

whereby said resultant effluent has a higher octane number than said naphtha cut and is suitable for use as a motorgrade gasoline and as a constituent of a blended fuel composition.

2. A process according to claim 1, wherein the carrier of said dehydrogenation catalyst is alumina, the specific surface of the catalyst being about 20–200 m$^2$/g and the pore volume being about 0.40–0.80 cc/g.

3. A process according to claim 1, wherein dehydrogenation step (b) is effected at a temperature of 450°–550° C., a pressure of 5–20 bars and an hourly velocity of 1 to 10 volumes of liquid charge per volume of catalyst.

4. A process according to claim 2, wherein the dehydrogenation catalyst has a neutralization heat lower than 30 joules per gram, a pore volume of about 0.45–0.70 cc/g and a specific surface of 50–100 m$^2$/g.

5. A process according to claim 1, wherein said cut is a naphtha cut recovered from coal liquefaction oils.

6. A process according to claim 1, wherein said hydrotreatment step (a) is effected at a pressure of 40–70 bars, a temperature of 350°–420° C. and an hourly velocity of 1–8 volumes of liquid charge per volume of catalyst.

* * * * *